(12) United States Patent
Hwang et al.

(10) Patent No.: US 7,864,830 B2
(45) Date of Patent: Jan. 4, 2011

(54) COGNITIVE UWB SYSTEM AND COGNITIVE UWB DATA COMMUNICATION METHOD

(75) Inventors: Jaeho Hwang, Incheon (KR); JaeMoung Kim, Incheon (KR)

(73) Assignee: Inha-Industry Partnership Institute, Inchon (KR)

( * ) Notice: Subject to any disclaimer, the term of this patent is extended or adjusted under 35 U.S.C. 154(b) by 758 days.

(21) Appl. No.: 11/755,789

(22) Filed: May 31, 2007

(65) Prior Publication Data
US 2008/0212650 A1    Sep. 4, 2008

(30) Foreign Application Priority Data
Mar. 2, 2007    (KR) .................. 10-2007-0020804

(51) Int. Cl.
*H04B 1/00*    (2006.01)
(52) U.S. Cl. .................. 375/130; 375/135; 375/136; 375/137; 375/219
(58) Field of Classification Search .......... 375/130; 455/67.13, 522
See application file for complete search history.

(56) References Cited

U.S. PATENT DOCUMENTS

| | | | | |
|---|---|---|---|---|
| 6,529,568 | B1 * | 3/2003 | Richards et al. ............ 375/346 |
| 6,882,315 | B2 * | 4/2005 | Richley et al. ............. 342/465 |
| 7,129,886 | B2 * | 10/2006 | Hall et al. ..................... 342/28 |
| 7,177,341 | B2 * | 2/2007 | McCorkle .................. 375/130 |
| 7,263,333 | B2 * | 8/2007 | Roberts ................... 455/67.13 |
| 7,298,317 | B2 * | 11/2007 | Charpentier et al. ........ 342/174 |
| 7,489,720 | B2 * | 2/2009 | Hinton et al. ............... 375/138 |
| 7,492,316 | B1 * | 2/2009 | Ameti et al. ............... 342/465 |
| 7,519,123 | B1 * | 4/2009 | Larsson et al. .............. 375/260 |
| 7,541,968 | B2 * | 6/2009 | Hall et al. ..................... 342/28 |
| 7,548,564 | B2 * | 6/2009 | Hyun et al. .................. 370/480 |
| 2002/0130807 | A1 * | 9/2002 | Hall et al. ..................... 342/28 |
| 2003/0007576 | A1 * | 1/2003 | Alavi et al. ................. 375/329 |
| 2004/0008617 | A1 * | 1/2004 | Dabak et al. ................ 370/208 |
| 2004/0021599 | A1 * | 2/2004 | Hall et al. ..................... 342/28 |

(Continued)

OTHER PUBLICATIONS

Flexible Spectrum Utilization in UWB System Using Cognitive Radio, Jaeho Hwang et al.

(Continued)

*Primary Examiner*—Chieh M Fan
*Assistant Examiner*—Santiago Garcia
(74) *Attorney, Agent, or Firm*—Bachman & LaPointe, P.C.

(57) ABSTRACT

A cognitive UWB system and a cognitive UWB data communication method. The system includes a cognitive UWB transmitter and a cognitive UWB receiver. The cognitive UWB transmitter includes a channel encoder for correcting error of data, a preamble inserter for inserting a preamble into the data, a mask information inserter for inserting mask information into the data, a cognitive UWB pulse generator for generating a pulse based on the mask information and the channel environment information, a pulse position modulator for modulating the pulse, and a radio frequency transmitter for wirelessly transmitting the data. The cognitive UWB receiver includes a radio frequency receiver for wirelessly receiving data, a synchronizer for synchronizing time of data, a spectrum detector for detecting the channel environment information, a mask information extractor for extracting the mask information, a cognitive UWB pulse generator for generating a pulse, a pulse position modulator for demodulating the pulse, and a channel decoder for correcting error of the demodulated data.

1 Claim, 11 Drawing Sheets

U.S. PATENT DOCUMENTS

| | | | |
|---|---|---|---|
| 2004/0108954 A1* | 6/2004 | Richley et al. | 342/387 |
| 2004/0109506 A1* | 6/2004 | Hinton et al. | 375/242 |
| 2005/0083199 A1* | 4/2005 | Hall et al. | 340/552 |
| 2005/0163042 A1* | 7/2005 | Roberts | 370/208 |
| 2005/0164642 A1* | 7/2005 | Roberts | 455/67.13 |
| 2005/0220173 A1* | 10/2005 | Zyren et al. | 375/130 |
| 2005/0232336 A1* | 10/2005 | Balakrishnan et al. | 375/130 |
| 2006/0171445 A1* | 8/2006 | Batra et al. | 375/130 |
| 2007/0042733 A1* | 2/2007 | Tomioka | 455/179.1 |
| 2007/0053410 A1* | 3/2007 | Mahonen et al. | 375/130 |
| 2007/0133387 A1* | 6/2007 | Arslan et al. | 370/206 |
| 2007/0213014 A1* | 9/2007 | Meacham et al. | 455/69 |
| 2008/0130534 A1* | 6/2008 | Tomioka | 370/310 |
| 2008/0151976 A1* | 6/2008 | Stoye | 375/219 |
| 2008/0212650 A1* | 9/2008 | Hwang et al. | 375/130 |
| 2008/0240271 A1* | 10/2008 | Berens | 375/260 |
| 2009/0232197 A1* | 9/2009 | Mimura et al. | 375/239 |

OTHER PUBLICATIONS

An Ultra-Wide band Umbilical Cord for Cognitive Radio Systems, Christophe Moy et al., 2005, IEEE 16th International Symposium on Personal, Indoor and Mobile Radio Communicati.

UWB Coexistence and Cognitive Radio—Him Lansford, 2004. IEEE, pp. 35-39.

Cognitive Ultra Wide Band Radio: A Research Vision and Its Open Challenges—Fabrizio Granelli et al., 2005, IEEE pp. 55-59.

* cited by examiner (a)

(b)

(c)

(a)

(b)

(c)

COGNITIVE UWB SYSTEM AND COGNITIVE UWB DATA COMMUNICATION METHOD

BACKGROUND OF THE INVENTION

1. Field of the Invention

The present invention relates generally to a cognitive UWB system and a cognitive UWB data communication method and, more particularly, to a cognitive UWB system and a cognitive UWB data communication method, which generate pulses using mask information and channel environment information, so that they can provide universal flexibility satisfying UWB frequency emission regulations imposed by individual countries, use unoccupied frequency bands in an UWB band so as to avoid interference with other systems, flexibly use the unoccupied frequency bands using channel detection and specific information by dividing a UWB frequency into a plurality of sub-frequency bands, improve transmission rates and communication quality using more sub-frequency bands when needed, and promote the efficiency of the use of frequencies using data communication at power higher than that of the UWB frequency emission regulations without exceeding a non-interference limit.

2. Description of the Related Art

In general, a UWB communication system refers to a wireless system that aims to transmit a large quantity of digital data via a wide spectrum frequency band at very low power in a local area.

Here, since a frequency of several GHz is used and a low output pulse is generated several thousands to several million times per second, the UWB communication system can transmit a large quantity of data at a low power of approximately 0.5 m/W over a distance of 70 m, and has a high transmission rate because the capacity thereof is proportional to a bandwidth and a Signal to Noise Ratio (SNR).

Moreover, the UWB communication system can reduce the period of a pulse using a pulse having a very short width for data communication, therefore data can be transmitted at a high transmission rate. Accordingly, the UWB communication system can reduce transmission energy, has a characteristic of being robust to a multi-path environment in a place including many obstacles, and has the characteristic of being resistant to surrounding interference because a signal is spread over a wide frequency band.

However, the UWB communication system has the following problems. That is, since the UWB communication system uses a wide band, it sends data at low power at a noise level, but may interfere with other wireless systems with regard to an impulse signal. Furthermore, since respective countries use different UWB masks, the problem of frequency usage may occur upon export to and use in different countries. Moreover, the UWB communication system cannot be flexibly changed according to a channel environment.

SUMMARY OF THE INVENTION

Accordingly, the present invention has been made keeping in mind the above problems occurring in the prior art, and an object of the present invention is to provide a cognitive UWB system and a cognitive UWB data communication method, which generate pulses using mask information and channel environment information, so that they can provide universal flexibility satisfying UWB frequency emission regulations imposed by individual countries, use unoccupied frequency bands in an UWB band so as to avoid interference with other systems, flexibly use the unoccupied frequency bands using channel detection and specific information by dividing a UWB frequency into a plurality of sub-frequency bands, improve transmission rates and communication quality using more sub-frequency bands when needed, and promote the efficiency of the use of frequencies using data communication at power higher than that of the UWB frequency emission regulations without exceeding a non-interference limit.

In order to accomplish the above object, the present invention provides a cognitive UWB system, including a cognitive UWB transmitter including a channel encoder for correcting error of data, a preamble inserter for inserting a preamble for synchronizing time into the data, a mask information inserter for inserting mask information into the data in order to flexibly adapt to different frequency emission regulations, a cognitive UWB pulse generator for generating a pulse based on the mask information and the channel environment information, a pulse position modulator for modulating the pulse based on time variation in position, and a radio frequency transmitter for wirelessly transmitting the data input from the pulse position modulator; and a cognitive UWB receiver including a radio frequency receiver for wirelessly receiving data, a synchronizer for synchronizing time of data using the preamble, a spectrum detector for detecting the channel environment information, a mask information extractor for extracting the mask information received from the cognitive UWB transmitter, a cognitive UWB pulse generator for generating a pulse using a frequency band satisfying the frequency emission regulations based on the mask information and the channel environment information, a pulse position modulator for demodulating the pulse, and a channel decoder for correcting error of the demodulated data.

Preferably, the cognitive UWB pulse generator includes a pulse mask code generator for generating the mask information and the channel environment information, which are respectively adaptive to the frequency emission regulations and the channel environment; and a basic pulse generator for generating an adaptive pulse, which is adaptive to the frequency emission regulation and the channel environment, using the mask information and the channel environment information.

Preferably, the pulse mask code generator may include a spectrum detector for detecting and coding channel environment information based on a matched filter technique in sub-frequency bands, divided into a plurality of bands, using a preamble signal for synchronizing time of the signal; a mask information inserter for flexibly selecting the input mask information; and a pulse mask code storage unit for generating and storing pulse mask code information, in which the channel environment and the mask information are combined with each other.

Preferably, the basic pulse generator may include a frequency generator for generating a center frequency and a Sinc window for forming a specific bandwidth for the center frequency input from the frequency generator.

Additionally, the present invention provides an UWB communication method, including the steps of a cognitive UWB transmitter requesting access to a data transmission link by wirelessly transmitting data, including mask information, to a cognitive UWB receiver so as to access the data transmission link; the cognitive UWB receiver generating pulse mask code information by combining the mask information of the wirelessly received data and channel environment information of a spectrum detector, generating a pulse corresponding to the mask code information, and wirelessly transmitting the pulse mask code information to the UWB transmitter; the cognitive UWB receiver transmitting the wirelessly transmitted pulse mask code information via a frequency band that satisfies frequency emission regulations; and the cognitive UWB receiver wirelessly receiving the data via the frequency band.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
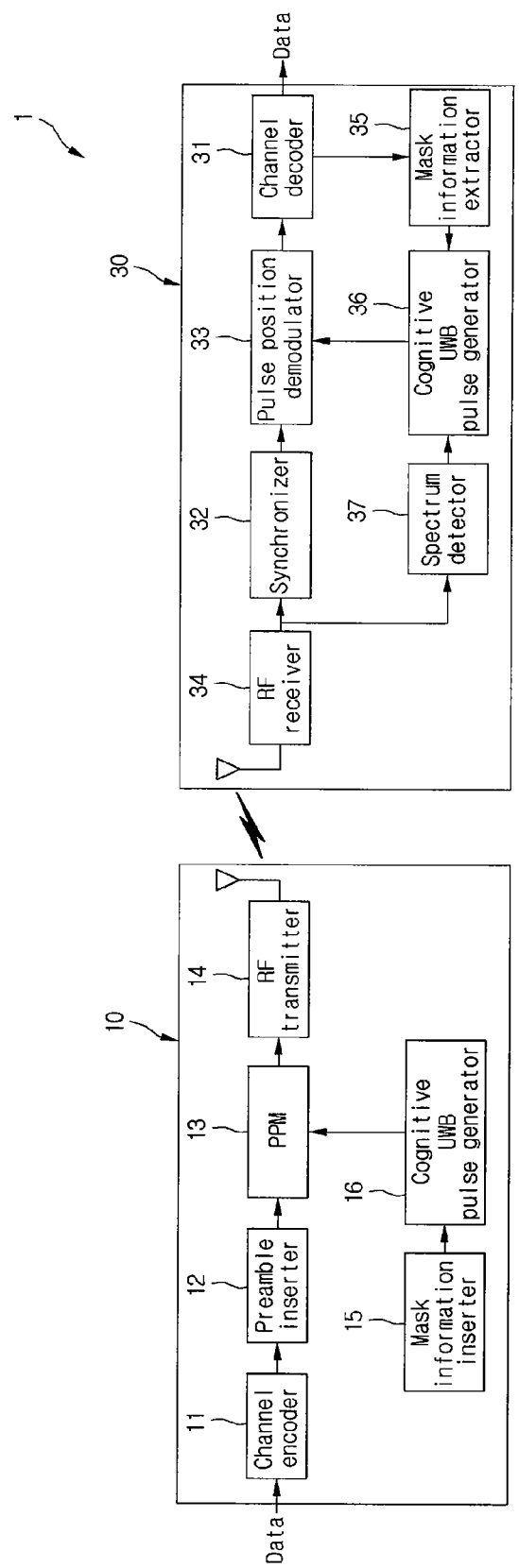
FIG. 1 is a block diagram schematically showing a cognitive UWB system according to the present invention.

Reference now should be made to the drawings, in which the same reference numerals are used throughout the different drawings to designate the same or similar components.

FIG. 1 is a block diagram schematically showing a cognitive UWB system according to the present invention. As shown in FIG. 1, the cognitive UWB system according to the present invention includes a cognitive UWB transmitter 10 and a cognitive UWB receiver 30.

The cognitive UWB transmitter 10 includes a channel encoder 11, a preamble inserter 12, a pulse position modulator (PPM) 13, a Radio Frequency (RF) transmitter 14, a mask information inserter 15, and a cognitive UWB pulse generator 16.

Here, the channel encoder 11 is provided to detect and correct errors at the time of transmission of data input into the cognitive UWB transmitter 10. The data passing through the channel encoder 11 passes through the preamble inserter 12 so as to insert a preamble for the synchronization of data.

Furthermore, the mask information inserter 15 inserts mask information into the data. Here, the mask information is frequency emission regulations that are enforced so as not to interfere with existing users, such as PCS users, wireless LAN users, or S-DMB users, who use frequencies defined differently to meet the circumstances of respective countries.

Moreover, the PPM 13 modulates data based on time variation in position by selecting a frequency that is several times as high as the highest frequency included in content to be transmitted as a repetitive frequency and changing the position of the generation of a pulse according to an input signal.

Moreover, the RF transmitter 14 for wirelessly transmitting data output input from the pulse position modulator 13 is included.

Meanwhile, the cognitive UWB receiver 30 includes a channel decoder 31, a synchronizer 32, a pulse position modulator 33, an RF receiver 34, a mask information extractor 35, a cognitive UWB pulse generator 36, and a spectrum detector 37.

Here, the RF receiver 34 is provided to receive data from the RF transmitter 14 and to use the received data as input to the cognitive UWB receiver 30.

The synchronizer 32 is provided to perform synchronization on data, input to the RF receiver 34, for wireless communication with the cognitive UWB transmitter 10. The synchronizer 32 performs synchronization on data using a preamble prior to the modulation of the data.

The spectrum detector 37 finds an unoccupied and empty desired channel by detecting a preamble signal input from the cognitive UWB transmitter 10, and thus acquires spectrum information. The mask information extractor 35 acquires and extracts mask information transmitted by the cognitive UWB transmitter 10.

The cognitive UWB pulse generator 36 of the cognitive UWB receiver 30 generates a pulse corresponding to the frequency in order to flexibly change the unoccupied frequency band according to the channel environment information of the spectrum detector 37 and the mask information of the mask information extractor 35 and efficiently manage it.

The pulse position modulator 33 determines the position of a pulse using the pulse generated by the cognitive UWB pulse generator 36, and demodulates the data using time variation in the position of a signal.

Finally, the channel decoder 31 detects and corrects the errors of the modulated data and outputs error-free data.

Figure 2:
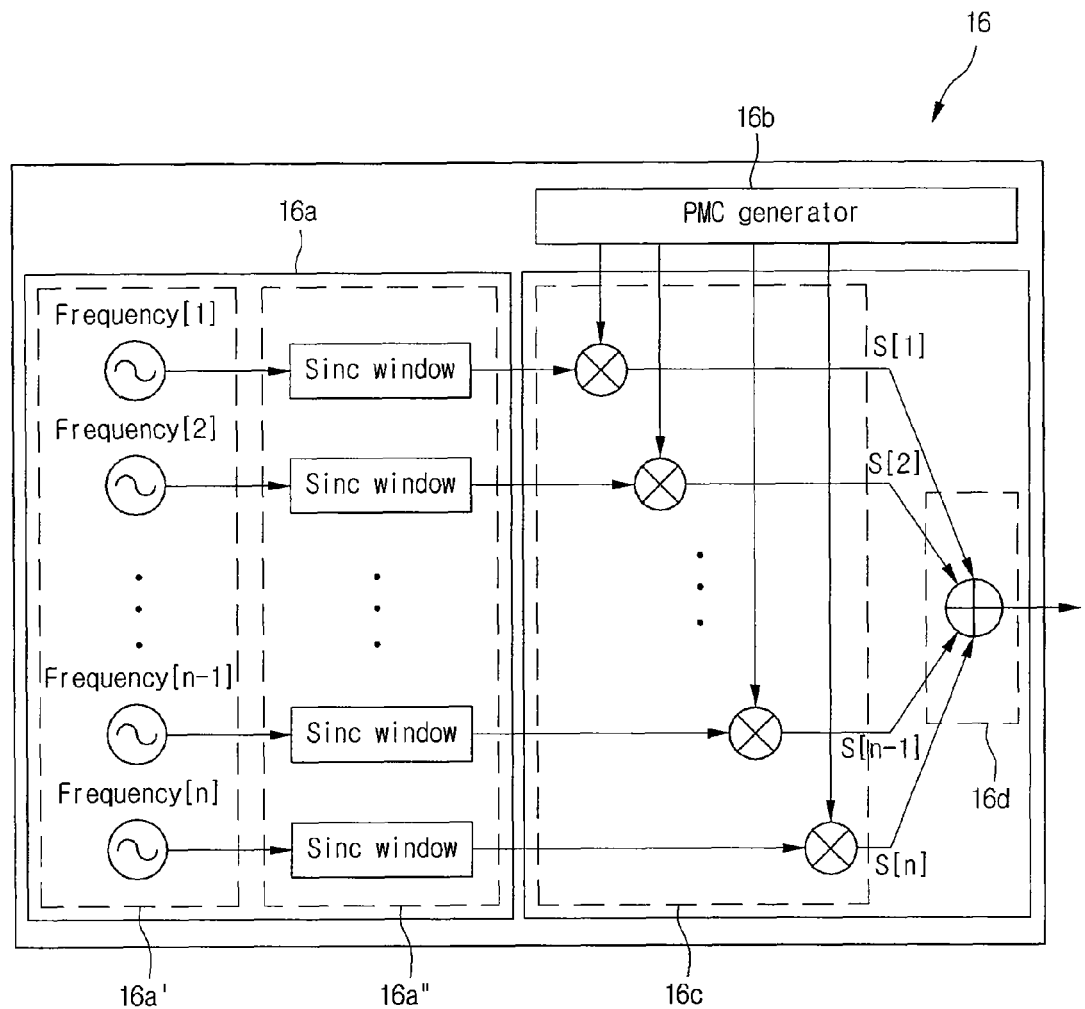
FIG. 2 is a block diagram schematically showing the cognitive UWB pulse generator of the cognitive UWB system according to the present invention.

FIG. 2 is a block diagram schematically showing the cognitive UWB pulse generator of the cognitive UWB system according to the present invention. As shown in FIG. 2, the cognitive UWB pulse generator 16 includes a basic pulse generator 16a, a PMC generator 16b, a multiplier 16c, and an adder 16d.

The basic pulse generator 16a divides an available UWB band into a plurality of sub-frequency bands, and generates basic pulses that occupy the divided sub-frequency bands.

The basic pulse generator 16a includes a frequency generator 16a' and a Sinc window 16a". The frequency generator 16a generates a center frequency, and passes it through the Sinc window 16a" in order to determine the width of sub-frequency bands to be obtained. The basic pulse, generated as described above, has a pulse width that lasts for a short period of time (several ns), like a UWB pulse. Since the frequency characteristics of the basic pulse satisfy the same mask characteristics as the UWB signal and the basic pulse and the UWB signal are orthogonal to each other, a new UWB pulse can be formed by combining them without avoiding interference.

Moreover, the PMC generator 16b requires mask information and channel environment information in order to generate a pulse that meets the frequency emission regulations of a target country and has an unoccupied frequency band in a wide frequency band. The cognitive UWB transmitter 10 and the cognitive UWB receiver 30 share the mask information and channel environment so as to generate a pulse that meets the channel environment and the regulations of a corresponding country.

With regard to the mask information, frequency use policies are different for respective countries and different regulations are applied to indoor and outdoor environments within a single set of regulations, so that a system that can be flexibly adapted to the regulations of all countries can be realized using the mask information of the countries. The channel environment is required to generate a pulse that is suitable for the channel situation while avoiding frequency bands being used.

A cognitive pulse is generated by passing basic pulses, selected using the information of the PMC generator 16b, through the multiplier 16c and the adder 16d, so that the basic pulses can be combined into a single pulse.

Figure 3:
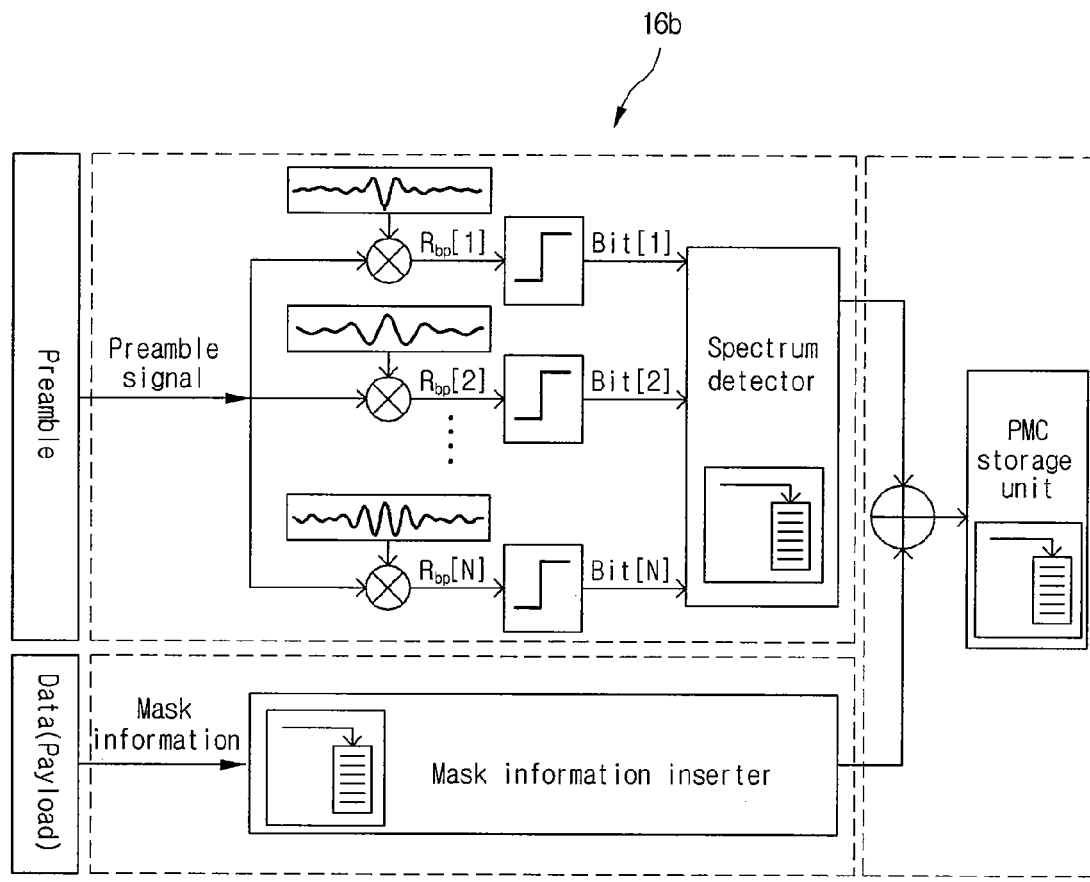
FIG. 3 is a block diagram schematically showing the cognitive PMC generator of the cognitive UWB system according to the present invention.

FIG. 3 is a block diagram schematically showing the cognitive PMC generator of the cognitive UWB system according to the present invention. As shown in FIG. 3, the PMC generator 16b according to the present invention is provided in order to obtain channel environment and mask information.

Here, the PMC generator 16b uses a channel sensing technique, that is, a kind of matched filter technique, to obtain channel environment information. Using the channel sensing technique, the PMC generator 16b performs matching using preamble signals as respective basic pulses, selects a desired channel without distortion based on a measured value using a threshold comparator, and codes the channel environment of the selected sub-frequency band to digital bits.

Meanwhile, the mask information is sent as the payload data of a signal frame, and PMC information is obtained by combining the mask information of the mask information inserter 15 and the spectrum detector 37 and the channel environment information, calculated through channel sensing, with each other, and is then stored in a PMC storage unit.

Figure 4:
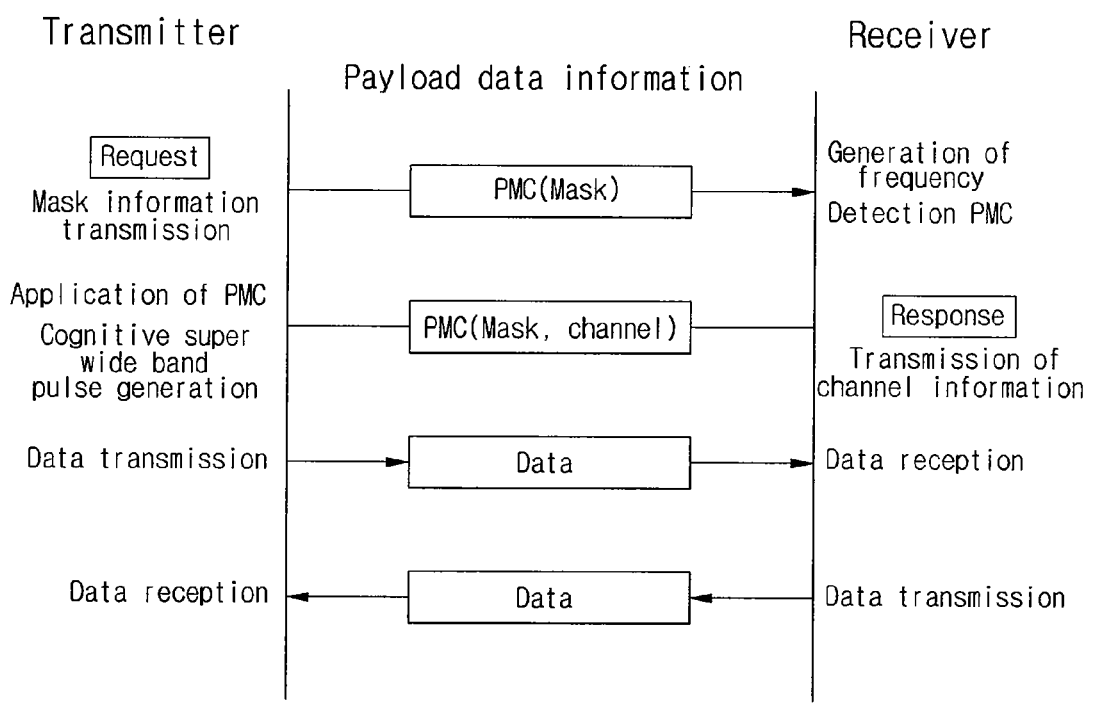
FIG. 4 is a diagram schematically showing a cognitive UWB data communication method according to the present invention.

FIG. 4 is a diagram schematically showing a cognitive UWB data communication method according to the present invention. FIG. 1 is to be referred to in conjunction with FIG. 4. As shown in FIG. 4, the cognitive UWB data communication method according to the present invention requires the exchange of information, so that the cognitive UWB transmitter 10 and the cognitive UWB receiver 30 can share the mask and channel environment information shown in FIG. 3.

The cognitive UWB transmitter 10 of the cognitive UWB system 1 requests a signal from the cognitive UWB receiver 30 with the mask information included in the signal. Here, the transmission channel that is used is a frequency band based only on the mask information. The request is made with the mask information included in a payload, in order to transmit the mask information to the receiving end.

In addition, when the cognitive UWB receiver 30 receives the signal, it acquires channel environment information for respective sub-frequency bands through spectrum sensing, and generates PMC information by combining the mask information, input from the cognitive UWB transmitter 10, with the acquired channel environment information, which is a combination of the channel environment information and the mask information. Furthermore, the cognitive UWB receiver 30 generates a cognitive UWB pulse using the PMC information, and sends a response signal to the cognitive UWB transmitter 10. Here, the response signal is PMC information in which the channel environment information and the mask information are included in a payload.

The cognitive UWB transmitter 10 receives the PMC information and generates a cognitive UWB pulse. Through this process, the cognitive UWB transmitter 10 and the cognitive UWB receiver 30 can share PMC information, that is, the same mask information and the same channel environment information, so that they can communicate with each other using a cognitive UWB pulse that satisfies mask information, that is, frequency emission regulations, and uses an unoccupied channel.

Figure 5:
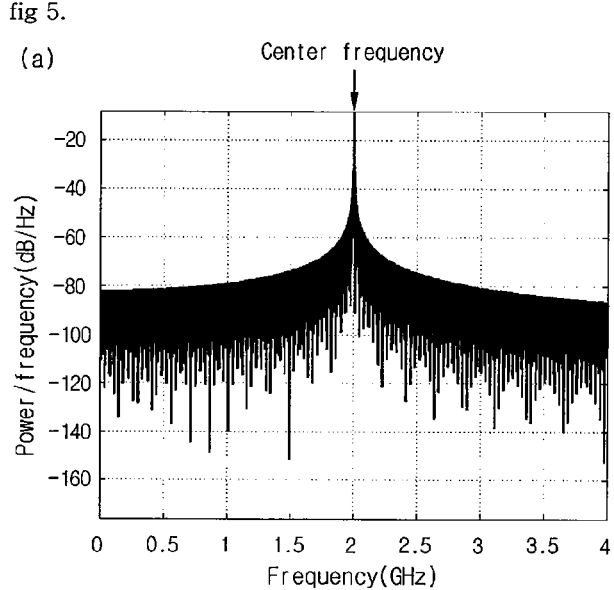
FIG. 5 is graphs showing a basic pulse generation process that is performed by the basic pulse generator of the cognitive UWB system of the present invention from the point of view of frequency.
Figure 5:
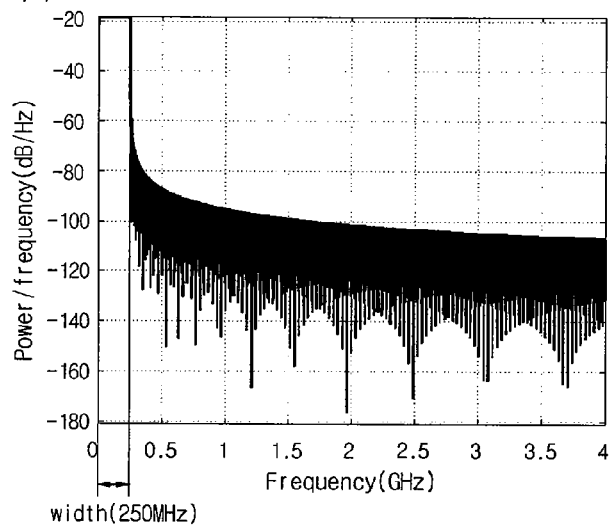
Figure 5:
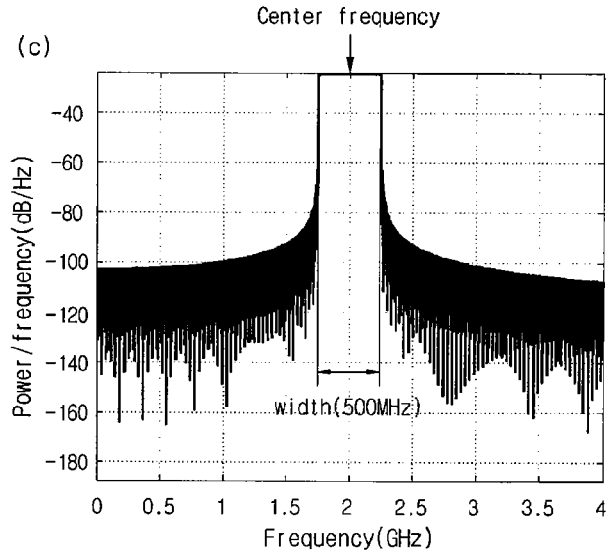

FIG. 5 is graphs showing the basic pulse generation process of the basic pulse generator of the cognitive UWB system of the present invention from the point of view of frequency. FIG. 2 is to be referred to in conjunction with FIG. 3. As shown in FIG. 5, the basic pulse generator 16a divides an available UWB band into a plurality of sub-frequency bands, and generates basic pulses that occupy the divided sub-frequency bands.

Furthermore, the basic pulse generator 16a includes a frequency generator 16a' and a Sinc window 16a''. The frequency generator 16a generates a center frequency, and passes it through the Sinc window 16a'' in order to determine the width of sub-frequency bands to be obtained. The basic pulse, generated as described above, has a pulse width that lasts for a short period of time (several ns), like a UWB pulse. Since the frequency characteristics of the basic pulse satisfy the same mask characteristics as the UWB signal, and the basic pulse and the UWB signal are orthogonal to each other, a new UWB pulse can be formed by combining them while avoiding interference.

The Sinc window 16'' has a frequency component of $f_p$ Hz, which is based on the following Equation 1.

$$h_{window}(t) = \text{sin } c(2f_p t) \quad (1)$$

The following Equation 2 represents the frequency characteristic of the window based on the Equation 1. The function of the Sinc window 16a'' has a band of $f_p$ Hz in a base band, which is a half of a sub-frequency bandwidth.

$$H_{window}(f) = \begin{cases} 1, & 0 < f < f_{fp} \\ 0, & f > f_{fp} \end{cases} \quad (2)$$

$$P_k(t) = h_{window}(t)\sin(2\pi f_k t) \quad (3)$$

Equation 3 is an equation that is used to generate a basic pulse. A basic pulse has a desired bandwidth around a center frequency because a sine wave having the center frequency of a sub-frequency band is passed through a window having the sub-frequency band.

A process of generating a basic pulse based on frequencies having a bandwidth of 500 MHz and a center frequency of 2 GHz is shown in FIGS. 5(a), (b), and (c). In FIG. 5(a), a sine wave in which $f_k$, indicating a center frequency, is 2 GHz is shown, and a signal is positioned around the sine wave across a 2 GHz band.

The signal is passed through a widow having a bandwidth of 500 MHz. A signal is illustrated from the point of view of the frequency of the window in FIG. 5(b). The signal is located in a base band, and has a bandwidth of 250 MHz, which is half of a window band frequency $f_p$. The signal, generated as described above, is a basic signal that has a center frequency of 2 GHz and a bandwidth of 500 MHz, as shown in FIG. 5c.

Figure 6:
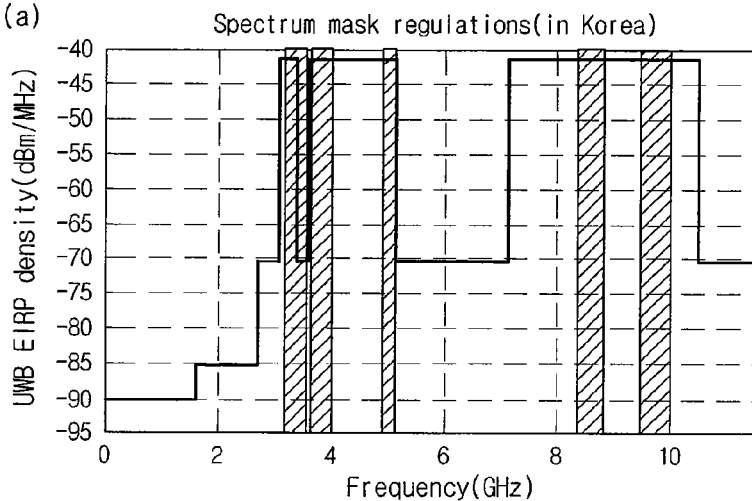
FIG. 6 is graphs showing a pulse generation process that is performed by the cognitive UWB pulse generator of the cognitive UWB system according to the present invention.
Figure 6:
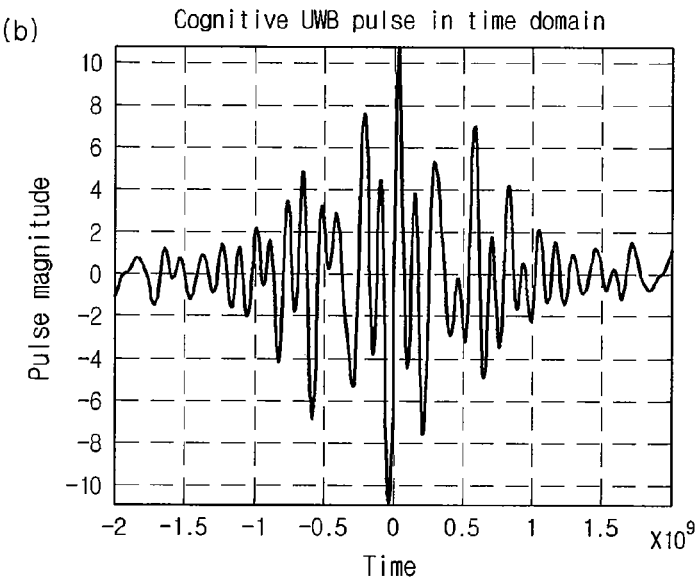
Figure 6:
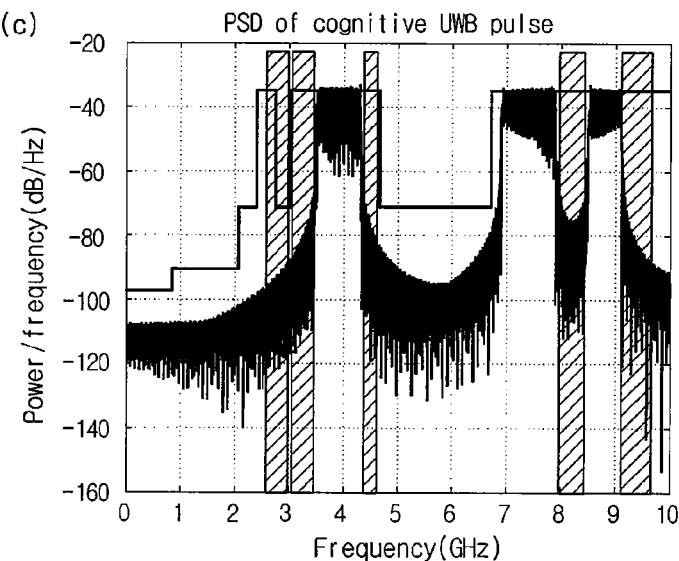

FIG. 6 is graphs showing the pulse generation process of the cognitive UWB pulse generator of the cognitive UWB system according to the present invention. FIG. 6(a) is a graph showing a frequency spectrum that indicates the use of a UWB mask and another system.

The mask information is frequency emission regulations, which prevent interference with existing systems while taking into consideration the fact that a band of 3.4 GHz~3.6 GHz is already used for PCSs, wireless LANs, WIBro, S-DMB, the 2.4 G ISM band, and mobile broadcasting repeaters, and a band of 5.15 GHz~7.1 GHz is already used for mobile broadcasting repeaters. Accordingly, as shown in FIG. 6(a), the existing systems interfere with a UWB system at different power levels while occupying different frequency bands near frequencies of 2.7, 3.2, 4.5, 8, and 9.2 GHz.

As described above, a UWB pulse, such as a pulse shown in FIG. 6(b), is generated using a cognitive UWB system based on the mask information and the channel environment, which are obtained as shown in FIG. 6(a). The obtained pulse has the characteristics of a UWB pulse, and a pulse is generated in consideration of the mask information and the channel situation, as shown in FIG. 6(c).

When the mask regulations are compared with the positions of interference, as shown in FIG. 6(a), existing UWB mask information is observed and frequency bands used by other existing systems are notched, so that the existing systems are not influenced.

Figure 7:
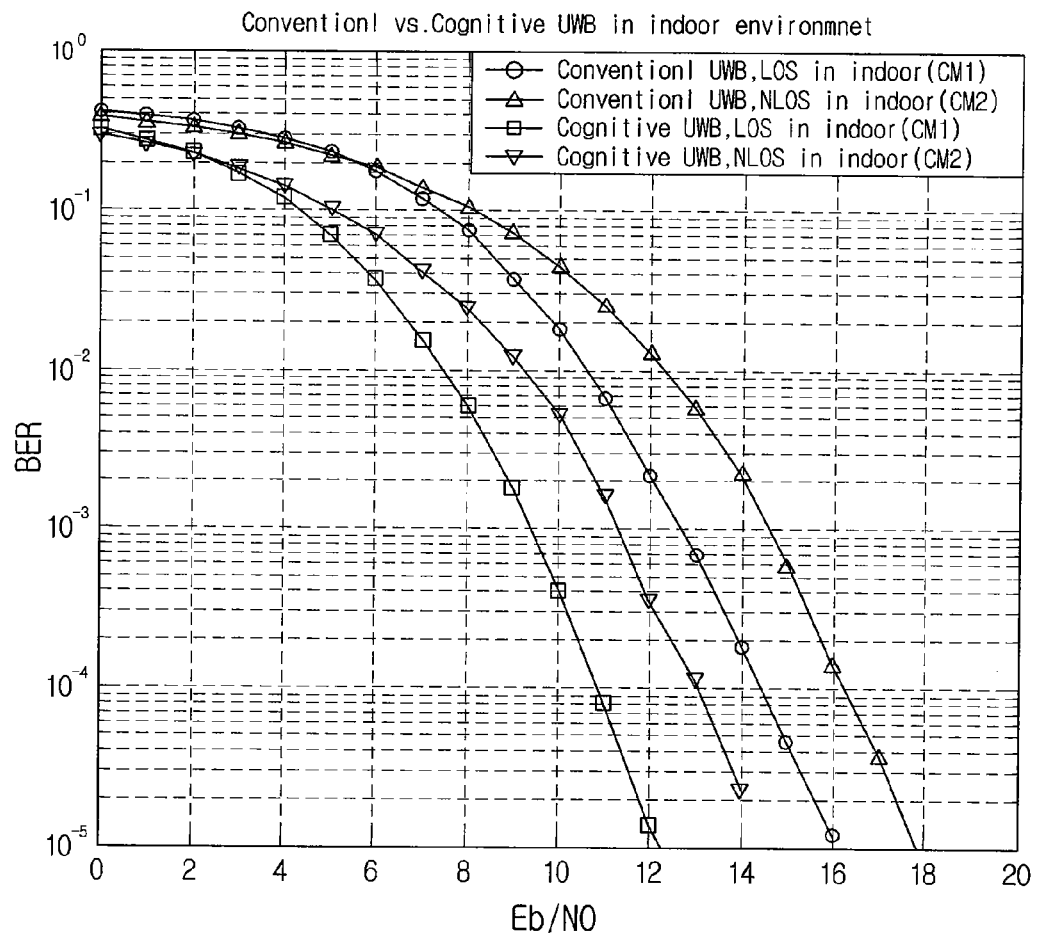
FIG. 7 is a graph showing the performance of the cognitive UWB system of the present invention and the performance of a conventional system in an indoor environment.

FIG. 7 is a graph showing the performance of the cognitive UWB system of the present invention and the performance of a conventional system in an indoor environment. As shown in FIG. 7, the performance of the cognitive UWB system and the performance of the conventional system are compared with each other through simulation.

In the simulation environment, a 4a impulse system is used, and a 2 PPM scheme is used as a modulation method, as illustrated in Table 1. The 2 PPM scheme is a scheme that sends one bit of data at the position of a pulse.

An energy detection scheme is used as a demodulation method, and ½ convolution code is used for channel coding. The characteristics of a channel are illustrated in Table 2.

Furthermore, a channel environment is divided into an indoor residential environment, an indoor office environment, an industrial environment and an outdoor environment, and each channel model is divided into Line Of Sight (LOS) and Non-Line of Sight (NLOS). It is assumed that interference is located at 3.2 GHz, 4.5 GHz, 5 GHz, 8.5 GHz, and 10 GHz and has power that exerts influence at an SINR of −3 dB.

TABLE 1

| | Value |
|---|---|
| Modulation | 2 PPM (pulse position modulation) |
| Demodulation | Energy detection |
| Channel coding | ½ convolution code |
| Channel decoding | Viterbi decoder |
| Channel model | AWGN, UWB 4a channel model |
| Interference | −3 dB (3.2, 4.5, 5, 8.5 GHz) | conventional system in the indoor environment (CM1 and CM2). CM1 is an LOS environment, in which a direct path exists. In contrast, CM2 is an NLOS environment, in which no direct path exists.

In the conventional system, CM1 having a direct path has performance higher than that in CM2 by 3.5 dB, but is influenced by external interference. In contrast, in the case of the cognitive UWB system, which selectively uses only desired channels, only desired channels can be selectively used by removing interference of 3 dB from the same channel, and both CM1 and CM2 exhibit a performance improvement of 3 dB.

Figure 8:
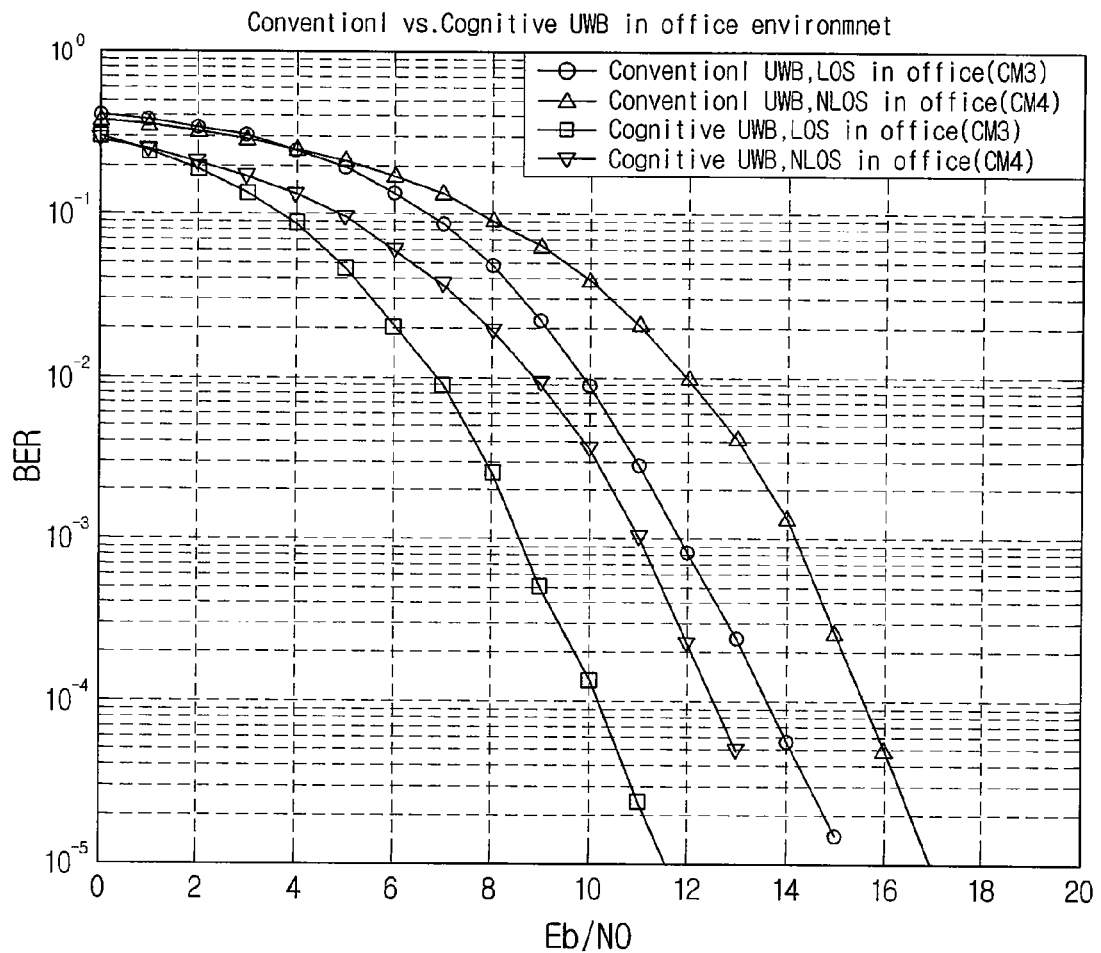
FIG. 8 is a graph showing the performance of the cognitive UWB system of the present invention and the performance of a conventional system in an office environment.

FIG. 8 is a graph showing the performance of the cognitive UWB system of the present invention and the performance of a conventional system in an office environment. As shown in FIG. 8, the graph is based on the simulation assumptions of Tables 1 and 2, which were employed in FIG. 7. FIG. 8 compares the cognitive UWB system with the conventional system in an office environment (CM3 and CM4).

CM3 is an LOS environment. In contrast, CM4 is an NLOS environment. The performance in the indoor office environment is similar to that in the indoor residential environment. CM3, having a direct path, has performance higher than that in CM4 by 3.5 dB. Even this case exhibits a performance improvement of 3 dB corresponding to the amount of interference, compared to the cognitive UWB system.

Figure 9:
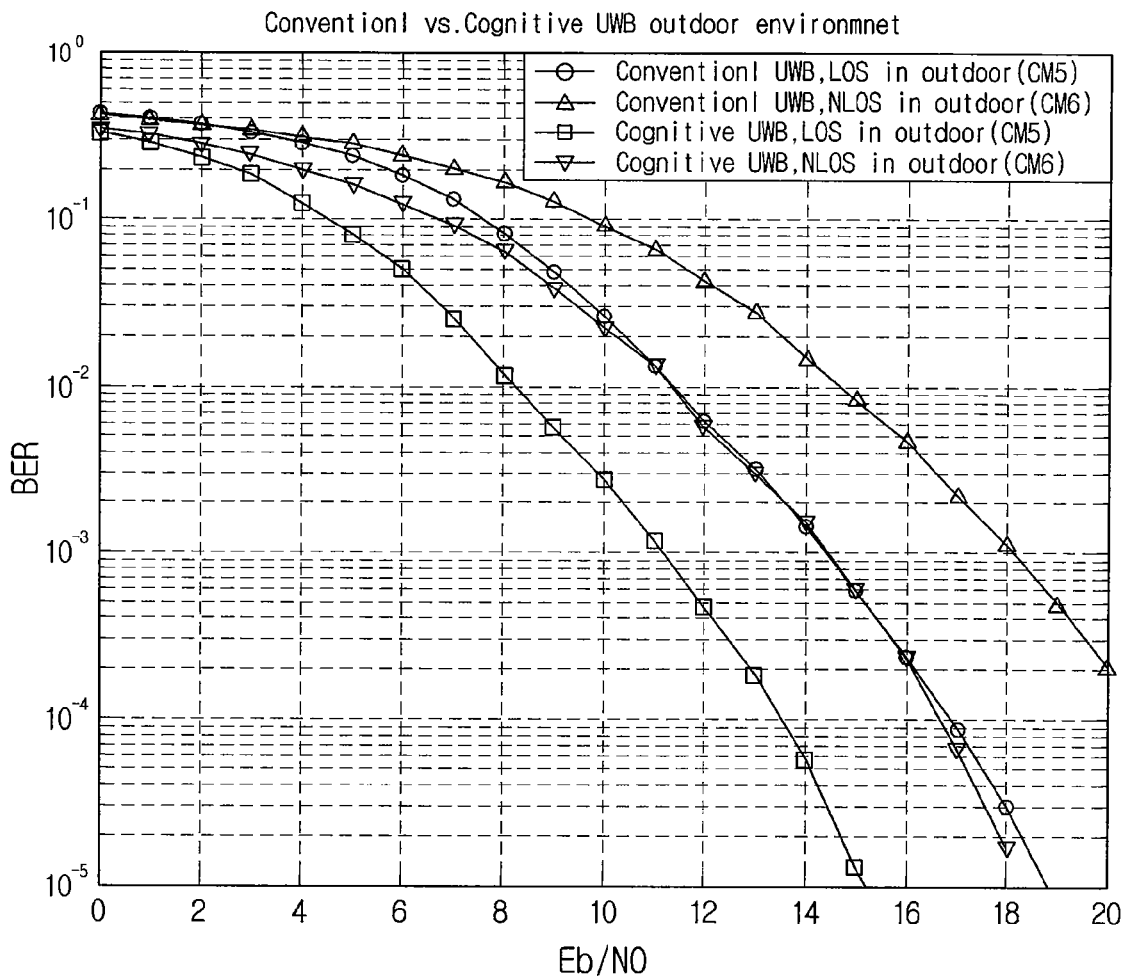
FIG. 9 is a graph showing the performance of the cognitive UWB system of the present invention and the performance of a conventional system in an industrial environment.

FIG. 9 is a graph showing the performance of the cognitive UWB system of the present invention and the performance of a conventional system in an outdoor environment. As shown in FIG. 9, the graph is based on the simulation assumptions of Tables 1 and 2, which were employed in FIG. 7. FIG. 9 compares the cognitive UWB system with the conventional system in an outdoor environment (CM5 and CM6). Here, CM5 is an LOS environment. In contrast, CM6 is an NLOS environment. CM5 has performance higher than that of CM6 by 4 dB.

In addition, the outdoor environment has lower performance than an indoor environment. The reason for this is that a system communicating at low power is sensitive to an environment in which there are strong external frequencies. However, even this case exhibits a performance improvement of 3 dB.

Figure 10:
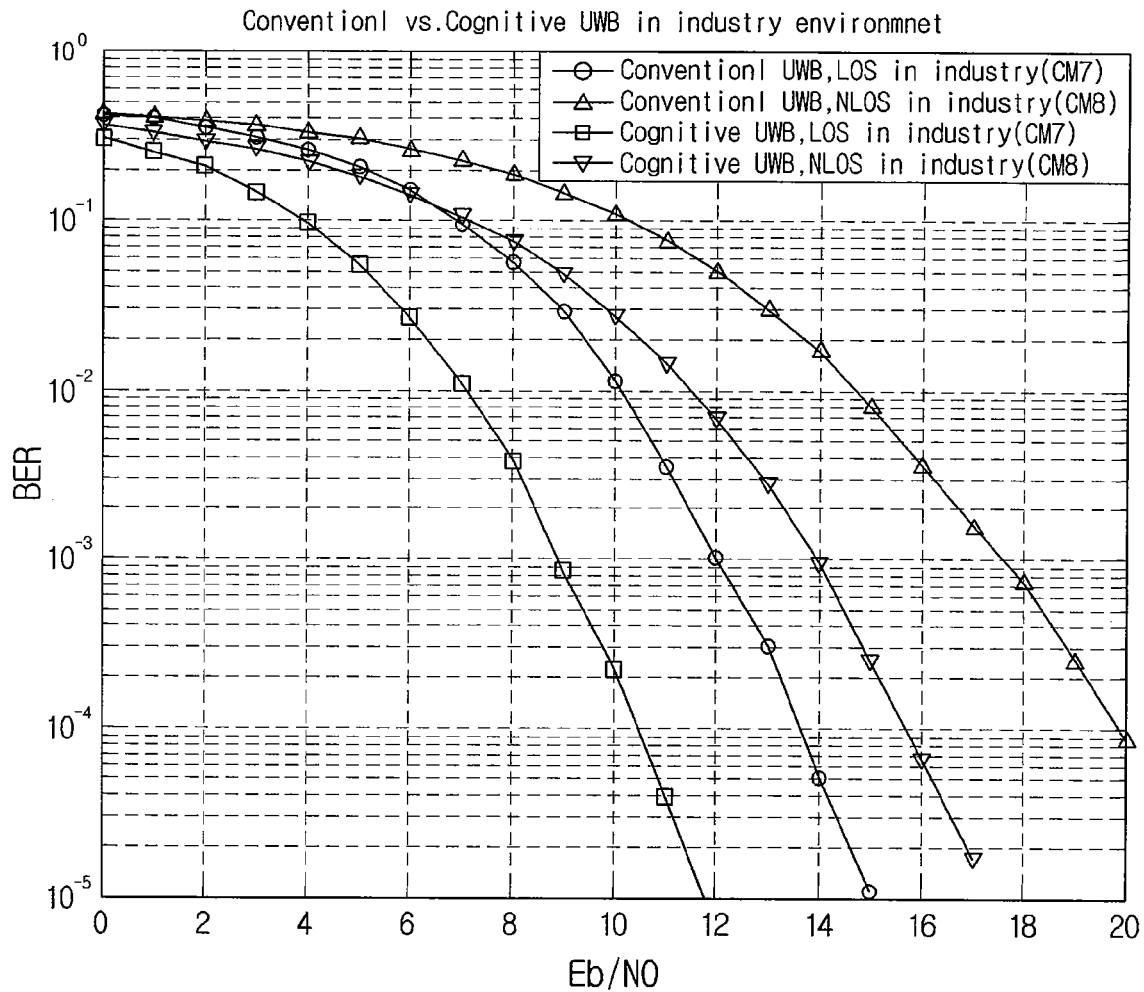
FIG. 10 is a graph showing the performance of the cognitive UWB system of the present invention and the performance of a conventional system in an outdoor environment.

FIG. 10 is a graph showing the performance of the cognitive UWB system of the present invention and the performance of a conventional system in an industrial environment.

TABLE 2

| | CM1 | CM2 | CM3 | CM4 | CM5 | CM6 | CM7 | CM8 |
|---|---|---|---|---|---|---|---|---|
| Environment | Indoor | Indoor | Office | Office | Outdoor | Outdoor | Industry | Industry |
| Condition | LOS | NLOS | LOS | NLOS | LOS | NLOS | LOS | NLOS |
| Valid range of d(m) | 7~20 | 7~20 | 3~28 | 3~28 | 2~8 | 2~8 | 5~17 | 5~17 |
| Path gain (dB) | −43.9 | −48.7 | −35.4 | −59.9 | −56.7 | −56.7 | −45.6 | −73.0 |
| Pathloss exponent | 1.79 | 4.58 | 1.63 | 3.06 | 1.2 | 2.15 | 1.76 | 2.5 |
| Mean number of cluster | 3 | 3.5 | 5.4 | 1 | 4.75 | 1 | 13.6 | 10.5 |
| Inter cluster decay constant (ns) | 22.61 | 26.27 | 14.6 | NA | 13.47 | NA | 31.7 | 104.7 |

Under the assumptions, FIG. 7 shows the comparison of the cognitive UWB system of the present invention with a As shown in FIG. 10, the graph is based on the simulation assumptions of Tables 1 and 2, which were employed in FIG.

7. FIG. 10 compares the cognitive UWB system with the conventional system in an industrial environment (CM7 and CM8). Here, CM7 is an LOS environment. In contrast, CM8 is an NLOS environment. CM7 has performance higher than that in CM8 by 4 dB.

Meanwhile, the industrial environment has performance lower than that in an indoor residential or office environment. The reason for this is that it is difficult to estimate a signal because there are many metallic machines, so that multiple high-power paths exist, thereby causing distortion of the signal.

As described above, when the cognitive UWB system is used, it exhibits an BER performance improvement of 3 dB using a desired channel in wireless communication while avoiding interference with other systems in any environment, such as a residential environment, an office environment, an industrial environment, and an outdoor environment.

Figure 11:
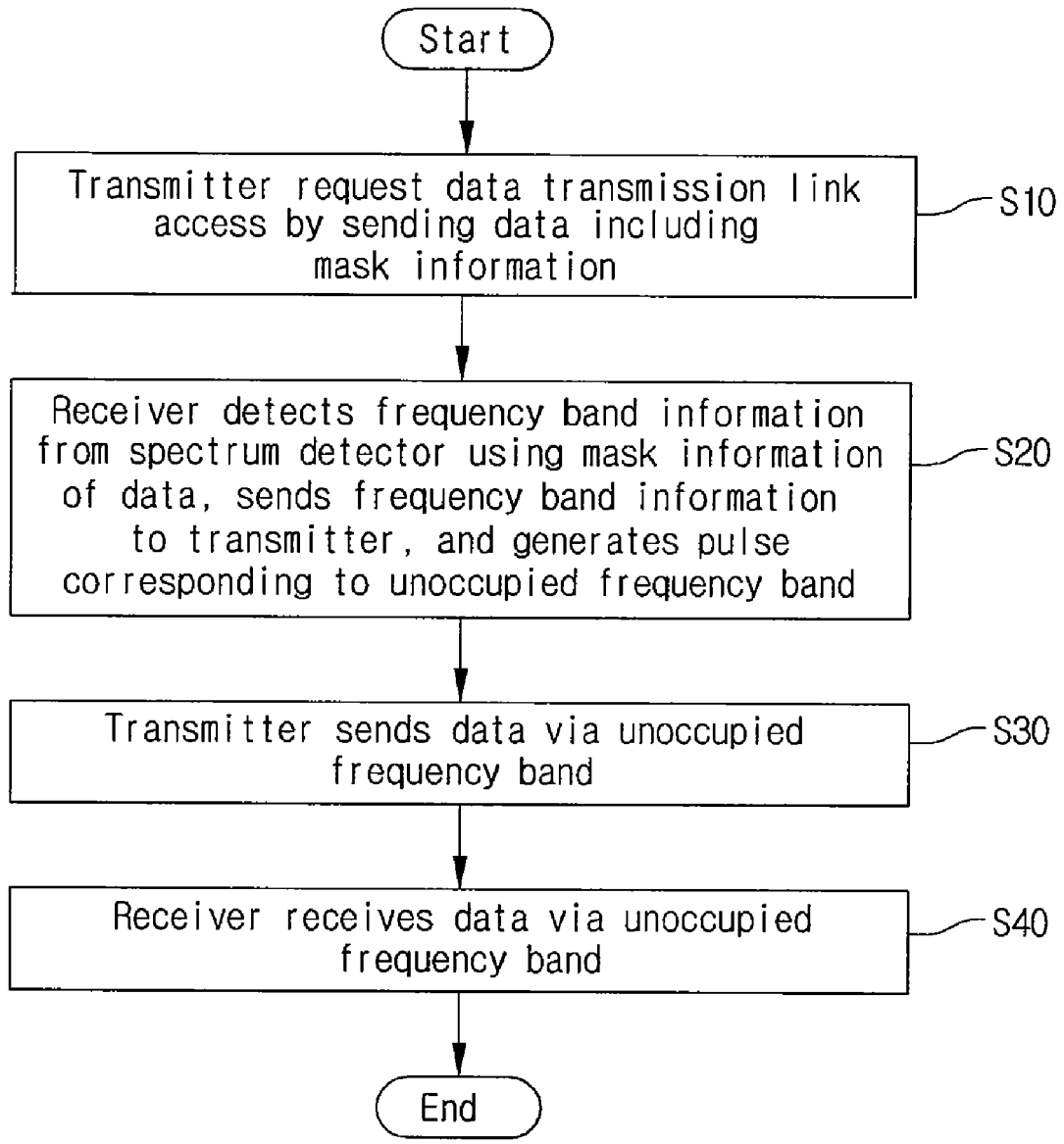
FIG. 11 is a flowchart schematically showing a cognitive UWB data communication method according to the present invention.

FIG. 11 is a flowchart schematically showing a cognitive UWB data communication method according to the present invention. As shown in FIG. 11, in order to access a data transmission link, the cognitive UWB transmitter requests access to the data transmission link from the cognitive UWB receiver by sending data, including mask information, to the cognitive UWB receiver at step S10.

Thereafter, the cognitive UWB receiver detects frequency band information in a spectrum detector using the mask information of the received data, sends the frequency band information to the transmitter, and generates a pulse corresponding to an unoccupied frequency band at step S20.

Meanwhile, the cognitive UWB transmitter sends data via an unoccupied frequency band based on a channel environment, that is, the transmitted frequency band information, at step S30.

The cognitive UWB receiver receives data via the unoccupied frequency band at step S40.

Here, the cognitive UWB transmitter inserts a synchronization preamble into the data to be optimized for the channel environment, and generates a pulse using a combination of mask information based on frequency emission regulations and channel environment information based on spectrum detection.

Furthermore, the cognitive UWB transmitter modulates data based on time variation in position, and wirelessly sends the modulated data. The cognitive UWB receiver wirelessly receives the data.

Furthermore, the cognitive UWB receiver performs synchronization on the data using the preamble for communication synchronization, searches for an unoccupied empty channel by detecting a preamble signal, acquires spectrum information, and acquires and extracts mask information received from the cognitive UWB transmitter.

Moreover, the position of a pulse is detected based on the channel environment information of the spectrum detector, and mask information and data is modulated based on time variation in the position of a signal.

As described above, according to the present invention, having the construction described above, when sub-frequencies that meet mask regulations, that is, frequency emission regulations, and do not cause interference with other systems, are combined and used, it is easy to avoid interference with other systems and it is possible to use a wider frequency band depending on the situation. As a result, the performance of a system can be improved and data can be transmitted at power higher than that specified by the UWB frequency emission regulations, therefore there is an advantage in that frequency usage efficiency can be increased.

Although the preferred embodiments of the present invention have been disclosed for illustrative purposes, the scope of the present invention is not limited to the specific embodiments, but it is apparent to those skilled in the art that appropriate modifications are possible without departing from the scope and spirit of the invention described in the accompanying claims of the present invention.

What is claimed is:

1. A cognitive UWB system, comprising:
a cognitive UWB transmitter comprising a channel encoder for correcting error of data, a preamble inserter for inserting a preamble for synchronizing time into the data, a mask information inserter for inserting mask information into the data in order to flexibly adapt to different frequency emission regulations, a cognitive pulse generator for generating a pulse based on the mask information and the channel environment information, a pulse position modulator for modulating the pulse based on time variation in position, and a radio frequency transmitter for wirelessly transmitting the data output input from the pulse position modulator; and
a cognitive UWB receiver comprising a radio frequency receiver for wirelessly receiving data, a synchronizer for synchronizing time of the data using the preamble, a spectrum detector for detecting the channel environment information, a mask information extractor for extracting the mask information received from the cognitive UWB transmitter, a cognitive UWB pulse generator for generating a pulse using a frequency band satisfying the frequency emission regulations based on the mask information and the channel environment information, a pulse position modulator for demodulating the pulse, and a channel decoder for correcting error of the demodulated data,
wherein the cognitive UWB pulse generator comprises:
a pulse mask code generator for generating the mask information and the channel environment information, which are respectively adaptive to the frequency emission regulations and the channel environment; and
a basic pulse generator for generating an adaptive pulse, which is adaptive to the frequency emission regulation and the channel environment, using the mask information and the channel environment information and,
wherein the pulse mask code generator comprises:
a spectrum detector for detecting and coding channel environment information based on a matched filter technique in sub-frequency bands, divided into a plurality of bands, using a preamble signal for synchronizing time of the signal; and
a mask information inserter for flexibly selecting the input mask information; and
a pulse mask code storage unit for generating and storing pulse mask code information, in which the channel environment and the mask information are combined with each other and,
wherein the basic pulse generator comprises:
a frequency generator for generating a center frequency; and
a sinc window for forming a specific bandwidth for the center frequency input from the frequency generator.

* * * * *